United States Patent
Okuhata et al.

(10) Patent No.: US 10,727,776 B2
(45) Date of Patent: Jul. 28, 2020

(54) MOTOR CONTROL DEVICE (71) Applicant: NIDEC TOSOK CORPORATION, Kanagawa (JP)

(72) Inventors: Yoshihisa Okuhata, Kanagawa (JP); Tadayuki Hatsuda, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/232,091

(22) Filed: Dec. 26, 2018

(65) Prior Publication Data

US 2019/0199269 A1 Jun. 27, 2019

(30) Foreign Application Priority Data

Dec. 27, 2017 (JP) ................. 2017-252402

(51) Int. Cl.
*H02P 29/64* (2016.01)
*H02P 27/08* (2006.01)

(52) U.S. Cl.
CPC .............. *H02P 29/64* (2016.02); *H02P 27/08* (2013.01); *H02P 2201/11* (2013.01)

(58) Field of Classification Search
CPC ................... H02P 27/06; H02M 1/32
See application file for complete search history.

(56) References Cited

U.S. PATENT DOCUMENTS

| 2012/0321917 | A1* | 12/2012 | Kazuno | H01M 8/04298 |
| | | | | 429/9 |
| 2013/0009586 | A1* | 1/2013 | Chen | H02P 25/18 |
| | | | | 318/504 |
| 2013/0065090 | A1* | 3/2013 | Kazuno | H01M 8/0488 |
| | | | | 429/9 |
| 2017/0149369 | A1* | 5/2017 | Watabu | H02P 27/06 |

FOREIGN PATENT DOCUMENTS

JP 2004208409 7/2004

* cited by examiner

*Primary Examiner* — Shawki S Ismail
*Assistant Examiner* — Zoheb S Imtiaz
(74) *Attorney, Agent, or Firm* — JCIPRNET (57) ABSTRACT

A control unit calculates necessary power necessary to drive a motor in accordance with a torque designation value and a rotational speed of a motor, sets a voltage value to a predetermined voltage value, changes a current value in accordance with the necessary power, and drive the motor in a case in which the calculated necessary power is less than a predetermined threshold value, and sets the current value to a predetermined current value, changes the voltage value in accordance with the necessary power, and drives the motor in a case in which the calculated necessary power is equal to or greater than the predetermined threshold value.

5 Claims, 9 Drawing Sheets

MOTOR CONTROL DEVICE

CROSS REFERENCE TO RELATED APPLICATIONS

The present disclosure claims priority under 35 U.S.C. § 119 to Japanese Application No. 2017-252402 filed on Dec. 27, 2017. The entire content of which is incorporated herein by reference.

BACKGROUND

Technical Field

The present disclosure relates to a motor control device that performs motor drive control.

Description of Related Art

A technology for controlling the motor drive power that serves as the power for a vehicle or the like using an inverter circuit is known.

For a motor control device in the related art, for example, a technology of providing a DCDC converter circuit that boosts a voltage from a power source and applies the voltage to an inverter circuit and setting a voltage boosting ratio of the voltage to be applied to the inverter circuit on the basis of information related to the amount of power consumption of the motor has been disclosed.

However, according to the technology disclosed in relation to the motor control device in the related art, a voltage value becomes excessively small and a loss at the inverter increases in some cases at the time of low output when the motor power is smaller than a specific value.

The present disclosure is to provide a motor control device capable of reducing a loss at an inverter at the time of low output.

SUMMARY

According to an aspect of a motor control device of an exemplary embodiment of the present disclosure in order to solve the aforementioned embodiment, there is provided a motor control device including: a torque designation value input unit that inputs a torque designation value indicating a necessary torque value; a rotational speed input unit that inputs a rotational speed of a motor; a control unit that calculates necessary power that is necessary to drive the motor in accordance with the input torque designation value and the input rotational speed of the motor and calculates a voltage value and a current value that are necessary to drive the motor in accordance with the calculated necessary power; a voltage supply unit that outputs a voltage in accordance with the calculated voltage value; and an inverter unit that generates a drive signal for driving the motor from the voltage output from the voltage supply unit in accordance with the calculated current value, in which the control unit sets the voltage value to a predetermined voltage value and changes the current value in accordance with the necessary power in a case in which the calculated necessary power is less than a predetermined threshold value, and sets the current value to a predetermined current value and changes the voltage value in accordance with the necessary power in a case in which the calculated necessary power is equal to or greater than the predetermined threshold value.

The above and other elements, features, steps and characteristics of the present disclosure will become more apparent from the following detailed description of the exemplary embodiments with reference to the attached drawings.

DESCRIPTION OF THE EMBODIMENTS

According to the exemplary embodiment of the present device with the aforementioned configuration, it is possible to reduce a loss at the inverter at the time of low output by changing a motor control method in accordance with whether or not necessary power is less than a threshold value.

Hereinafter, an embodiment for implementing the present disclosure will be described in detail with reference to the accompanying drawings.

Figure 1:
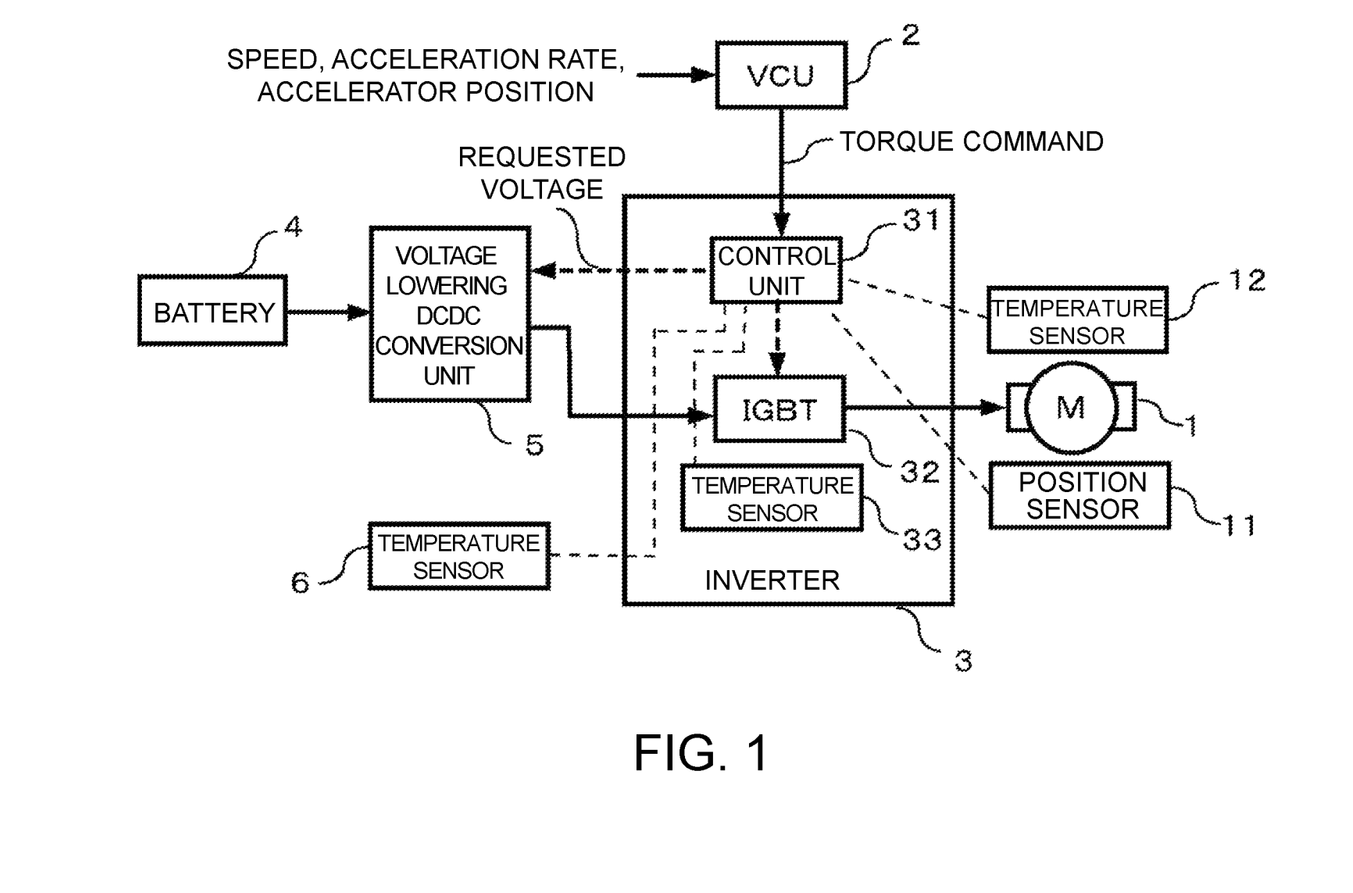
FIG. 1 is a block diagram illustrating a configuration example of a motor control device.

FIG. 1 is a block diagram illustrating a configuration example of a motor control device.

The motor control device includes a motor 1 that outputs drive force to a vehicle or the like, a vehicle control unit (VCU) 2 that outputs a torque command (torque designation value) in accordance with states of the vehicle, an inverter 3 that generates a drive voltage in accordance with the torque command from the VCU 2, the battery 4 that supplies a DC power source voltage (VBATT), a voltage lowering DCDC conversion unit 5 that lowers the power source voltage from the battery 4 in accordance with designation from the inverter 3 and supplies the power source voltage to the inverter 3, and a temperature sensor 6 that detects a temperature in the surroundings of the motor 1, a temperature of a coolant that cools the motor 1, and the like. In the motor control device, the voltage lowering DCDC conversion unit 5 lowers the voltage at a predetermined voltage lowering ratio from the voltage (VBATT) of the battery 4 in accordance with a voltage requested by a control unit 31 of the inverter 3 and supplies the lowered voltage V to the inverter 3.

The motor 1 is formed of a brushless motor that includes a rotor that is provided such that the rotor can turn about a rotation axis that has an output end, for example, a stator that has a field coil or the like that generates a magnetic field by a drive current in accordance with a three-phase drive voltage, and a housing that accommodates the rotor, the stator, and the like. A permanent magnet is attached to the rotor, and the rotor rotates about the rotation axis thereof as the center in accordance with the magnetic field generated by the field coil and outputs drive force from one end (output end) of the rotation axis.

In addition, position sensors 11 that detect an angle of the rotor and a temperature sensor 12 that detects a temperature of the motor 1 are provided in the motor 1. The position sensors 11 are arranged at every 120° in the surroundings of the rotor, for example, include three magnetic sensors such as hall elements that detect magnetism of the rotor, and detect the angle of the rotor. Note that the angle of the rotor may be detected by another mechanism such as a rotary encoder. The temperature sensor 12 includes a temperature detection element such as a thermistor, detects the temperature of the motor 1 such as a field coil, and supplies the temperature to the inverter 3.

The VCU 2 generates a torque command indicating a value of a necessary torque in accordance with states of the vehicle such as a current accelerator position, a vehicle speed, an acceleration rate at the time of acceleration or deceleration, and the like and supplies the torque command to the inverter 3.

The inverter 3 includes a control unit 31 that controls operations of the entire inverter 3, an insulated gate bipolar transistor (IGBT) module (hereinafter, simply referred to as IGBT) 32 that performs switching of the voltage V supplied from the voltage lowering DCDC conversion unit 5 in accordance with designation from the control unit 31 and generates the three-phase drive voltage, and a temperature sensor 33 that detects a temperature of the IGBT 32 or the like. The IGBT 32 includes three sets of, namely six switching elements (IGBT elements) for generating three-phase drive voltages. Note that switching elements such as metal oxide semiconductor field effect transistors (MOS-FET) may be used instead of the IGBT elements.

The control unit 31 compares the voltage detected by the position sensors 11 with a predetermined reference voltage and detects the angle of the rotor in units of 60° in accordance with a result of the comparison. In addition, the control unit 31 detects a rotational speed of the motor 1 on the basis of the voltage detected by the position sensors 11. Note that the rotational speed of the motor may be detected by using a sensor that is different from the position sensors 11.

Figure 2:
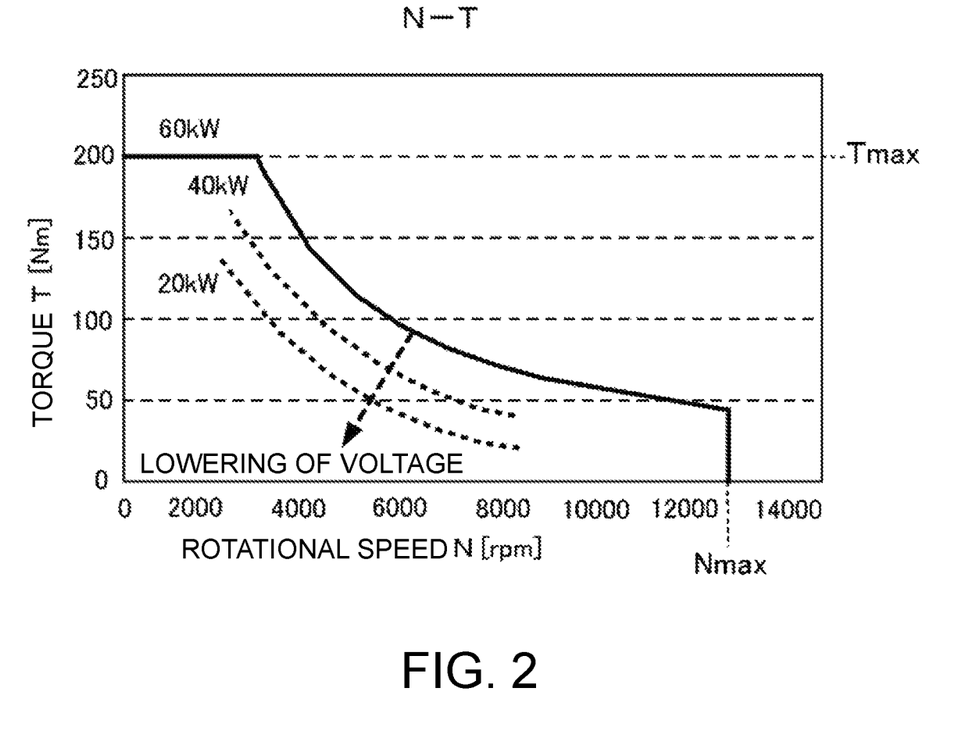
FIG. 2 is a diagram illustrating a relationship of power consumption of a motor, a rotational speed N of the motor, and a torque T.

The control unit 31 calculates necessary power that is necessary to drive the motor in accordance with the torque command from the VCU 2 and the detected rotational speed of the motor 1. A relationship between the rotational speed N and the torque T of the motor 1 changes in accordance with power consumption of the motor 1 as illustrated in FIG. 2, for example. The relationship between the rotational speed N and the torque T of the motor 1 is like the solid line in the drawing when the power consumption is 60 kW and is like each broken line when the power consumption is 40 kW or 20 kW, respectively. Therefore, the control unit 31 calculates power consumption with which a necessary torque can be obtained as necessary power in accordance with the toque command and the rotational speed of the motor 1 on the basis of such a relationship.

Further, the control unit 31 calculates a voltage value and a current value necessary to drive the motor 1 in accordance with the calculated necessary power. The control unit 31 supplies the calculated voltage value as a requested voltage to the voltage lowering DCDC conversion unit 5. The voltage lowering DCDC conversion unit 5 supplies, to the inverter 3, the voltage V lowered at a predetermined voltage lowering ratio from the voltage (VBATT) of the battery 4 in accordance with the voltage requested by the control unit 31.

Note that since the necessary power is calculated in accordance with the torque command from the VCU 2 and the detected rotational speed of the motor 1, and the torque command is generated in accordance with an accelerator position and the like, the voltage lowering ratio is a value in accordance with the accelerator position.

Figure 3:
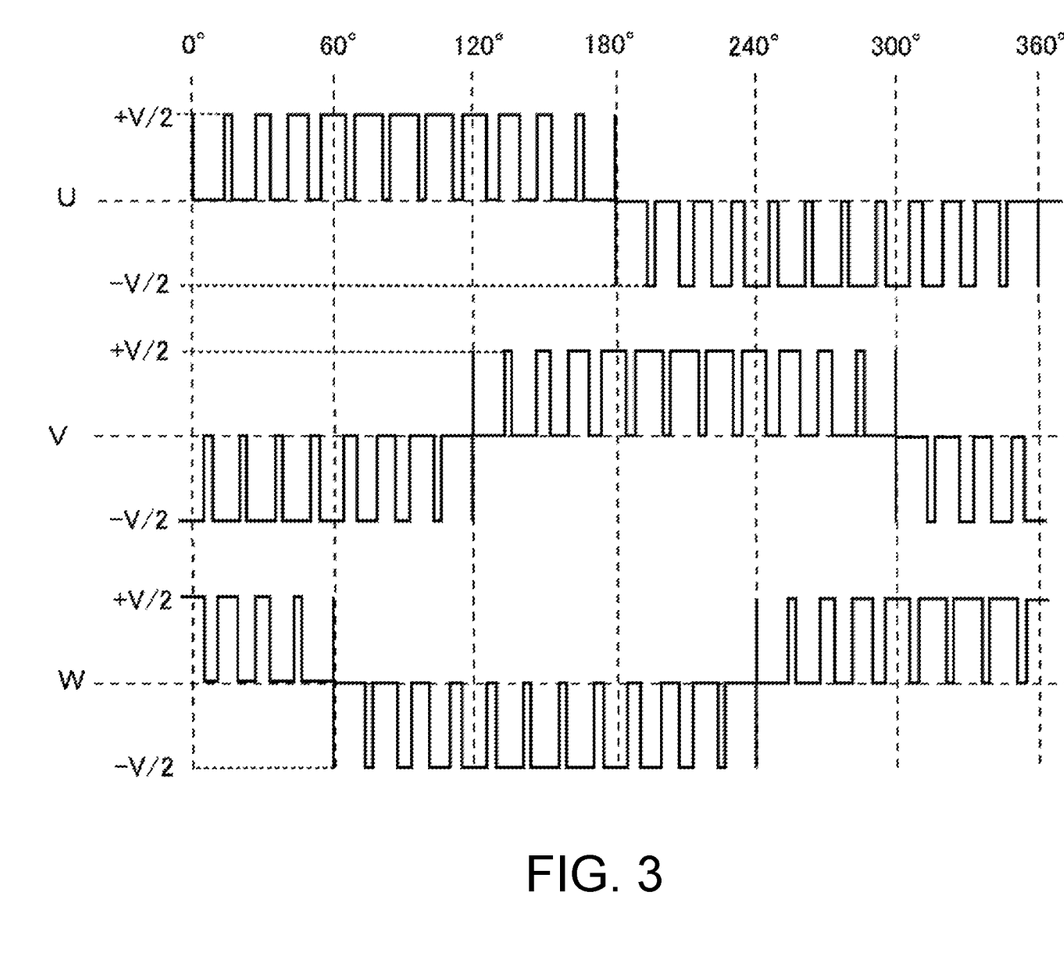
FIG. 3 is a diagram schematically illustrating an example of a waveform of a drive voltage for driving the motor.

The control unit 31 controls switching of the respective switching elements of the IGBT 32 in accordance with the rotation angle of the rotor detected as described above and the current value calculated as described above and generates drive voltages (drive signals) of three phases (a U phase, a V phase, and a W phase) as illustrated in FIG. 3, for example. The waveforms of the drive voltages indicate waveforms in a case in which pulse width modulation (PWM) control is performed such that an effective value of the drive current flowing through the field coil of the motor 1 (hereinafter, simply referred to as a current value) becomes a predetermined current in a case of sine wave drive. The control unit 31 controls a duty ratio of pulses of the drive voltages in accordance with the current value. Specifically, the control unit 31 changes a modulation level of PWM. Note that FIG. 3 schematically illustrates a state in which the modulation level is set to about 0.8 in a case of a variable current, which will be described later. In this case, the pulse width is 0.8 times as large as that in a case in which the modulation level is 1. Also, the modulation level is set to about 1 (strictly, about 0.98) in a case of a variable voltage, which will be described later. In addition, a modulation frequency of PWM is about several kHz in practice.

The drive voltages generated by the IGBT 32 are supplied to the field coil of the stator of the motor 1, a drive current in accordance with the drive voltages flows through the field coil, and a torque is generated at the rotor by a mutual action of the magnetic field generated by the field coil and the permanent magnet of the rotor. This torque is output to the outside via the output end of the rotor.

Figure 4:
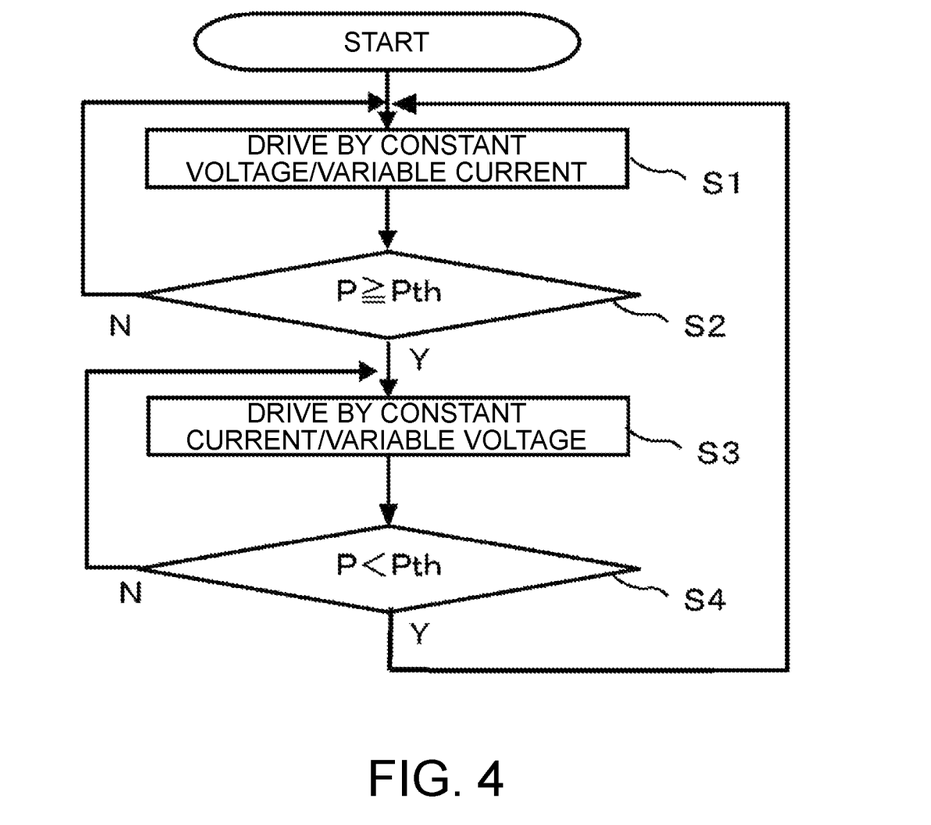
FIG. 4 is a flowchart illustrating motor control processing.

FIG. 4 is a flowchart illustrating motor control processing performed by the motor control device.

In the motor control device, the control unit 31 sets a voltage value V to a predetermined voltage value V' and changes a current value I in accordance with necessary power P in a case in which the necessary power P calculated as described above is less than a threshold value Pth, and the control unit 31 sets the current value to a predetermined current value I' and changes the voltage value V in accordance with the necessary power P in a case in which the necessary power P is equal to or greater than the threshold value Pth. That is, in the motor control device, the control unit 31 changes the method of controlling the motor depending on whether or not the necessary power P obtained in accordance with the torque command from the VCU 2 and the rotational speed of the motor is equal to or greater than the predetermined threshold value Pth.

First, the control unit 31 starts driving in a state in which the motor 1 is stopped, then sets the voltage value V to be constant at the predetermined voltage V' (constant voltage) and changes the current value I in accordance with the necessary power P (variable current). The control unit 31 controls driving of the motor 1 as described above on the basis of the voltage value and the current value obtained as described above (S1).

Further, the control unit 31 determines whether or not the requested power P exceeds the predetermined threshold value Pth (S2). If the requested power P is less than the predetermined threshold value Pth, the control unit 31 continues the processing in S1. If the requested power P is equal to or greater than the predetermined threshold value Pth, the control unit 31 moves on to S3, sets the current value I to be constant at the predetermined current I' (constant current), and changes the voltage value V in accordance with the necessary power P (variable voltage). The control unit 31 controls driving of the motor 1 as described above on the basis of the voltage value and the current value obtained as described above.

Further, the control unit 31 determines whether or not the requested power P is less than the predetermined threshold value Pth (S4). If the requested power P is equal to or greater than the predetermined threshold value Pth, the control unit 31 continues the processing in S3. If the requested power P is less than the predetermined threshold value Pth, the control unit 31 moves on to S1 and repeats the aforementioned processing.

Figure 5:
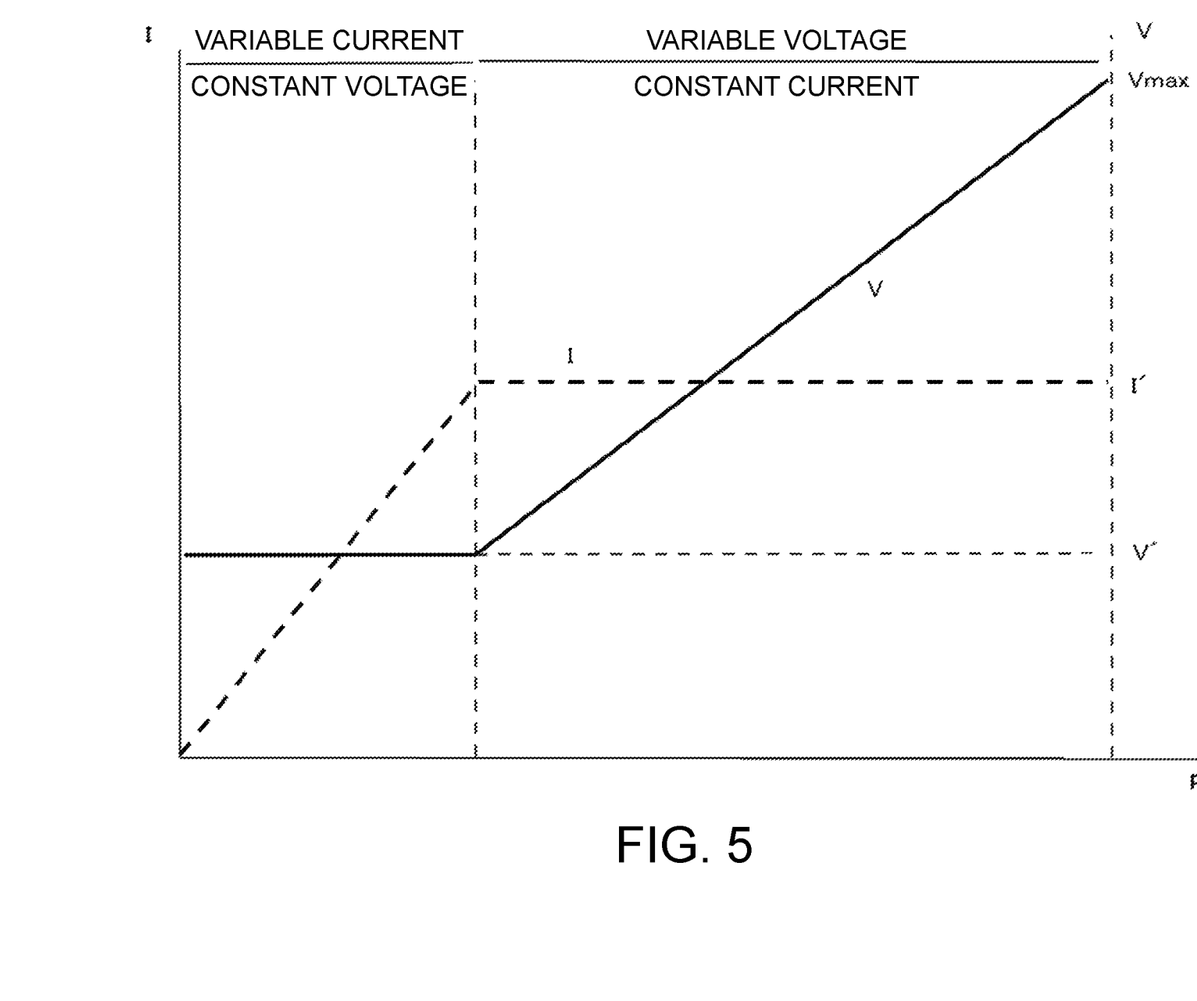
FIG. 5 is a diagram illustrating a relationship of a power P, a drive voltage V, and a drive current I required to drive the motor.

As for the relationship of the necessary power P, the drive voltage of the motor 1 (the voltage V supplied from the voltage lowering DCDC conversion unit 5), and the drive current I of the motor 1 as a result of performing the control as described above, the motor 1 is driven in a state in which the voltage is constant (V') if the necessary power P is less than the threshold value Pth and in a state in which the current is constant (I') if the necessary power P is equal to or greater than the threshold value Pth as illustrated in FIG. 5.

Figure 6:
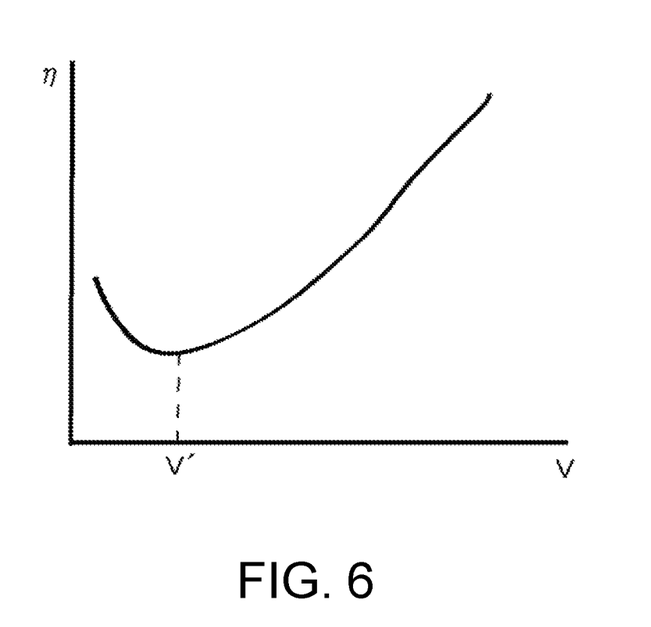
FIG. 6 is a diagram illustrating a relationship between a voltage V to be applied to an inverter and a loss $\eta$ of the inverter.

Incidentally, a loss η at the inverter 3 increases even if the voltage V (supplied from the voltage lowering DCDC conversion unit 5) decreases or increases at the boundary of the predetermined voltage (V') as illustrated in FIG. 6, for example.

Therefore, the value of the threshold value Pth is decided in accordance with a value with which the voltage V becomes the voltage V' in a case in which constant current/variable voltage control is performed in the embodiment.

Further, the control of the power consumption of the motor 1 in accordance with the necessary power is performed by setting the current to the constant value I' and controlling the voltage V by lowering the voltage by the aforementioned voltage lowering DCDC conversion unit 5 as described above in the region in which the requested power P is equal to or greater than the threshold value Pth in the embodiment. In this manner, it is possible to reduce the value of the voltage V to a necessary minimum value and to reduce a total loss of the inverter 3.

Also, the control of the power consumption of the motor 1 in accordance with the necessary power is performed by setting the voltage V to be constant at the predetermined value V' and controlling the current I by changing the pulse duty ratio of the drive voltage as described above in the region in which the power consumption is less than the threshold value Pth in the embodiment. In this manner, it is possible to reduce the loss of the inverter 3 in a region in which the necessary power is small, that is, at the time of low output in which the output from the motor 1 is low.

As described above, the voltage value is set to the predetermined value (V'), and the current value is changed in accordance with the necessary power in a case in which the necessary power that is necessary to drive the motor is less than the threshold value (Pth), and the current value is set to the predetermined current value (I') and the voltage value is changed in accordance with the necessary power in a case in which the necessary power is equal to or greater than the threshold value (Pth) in the embodiment. That is, it is possible to reduce the loss at the inverter at the time of low output by changing the method of controlling the motor in accordance with whether or not the necessary power is less than the threshold value. That is, it is possible to perform appropriate motor drive control in accordance with traveling conditions (vehicle states) while keeping a minimum loss at the inverter according to the embodiment.

The motor control device according to a modification example is configured similarly to that in FIG. 1 as described above.

Although the method of controlling the motor is changed in accordance with whether or not the necessary power is less than the threshold value in the aforementioned first embodiment, the method of controlling the motor is changed in accordance with the temperature of the motor in the second embodiment.

In the motor control device, the control unit 31 calculates the necessary power that is necessary to drive the motor in accordance with the torque command from the VCU 2 and the detected rotational speed of the motor 1 and calculates the voltage value and the current value that are necessary to drive the motor 1 in accordance with the necessary power similarly to the aforementioned first embodiment. Further, the control unit 31 causes the voltage V generated by the voltage lowering DCDC conversion unit 5 in accordance with the calculated voltage value to be supplied to the inverter 3, controls switching of the IGBT 32 in accordance with the calculated current value, and generates a drive voltage.

In the motor control device according to the embodiment, the method of controlling the motor is further changed in accordance with the temperature of the motor 1 detected by the temperature sensor 12.

Figure 7:
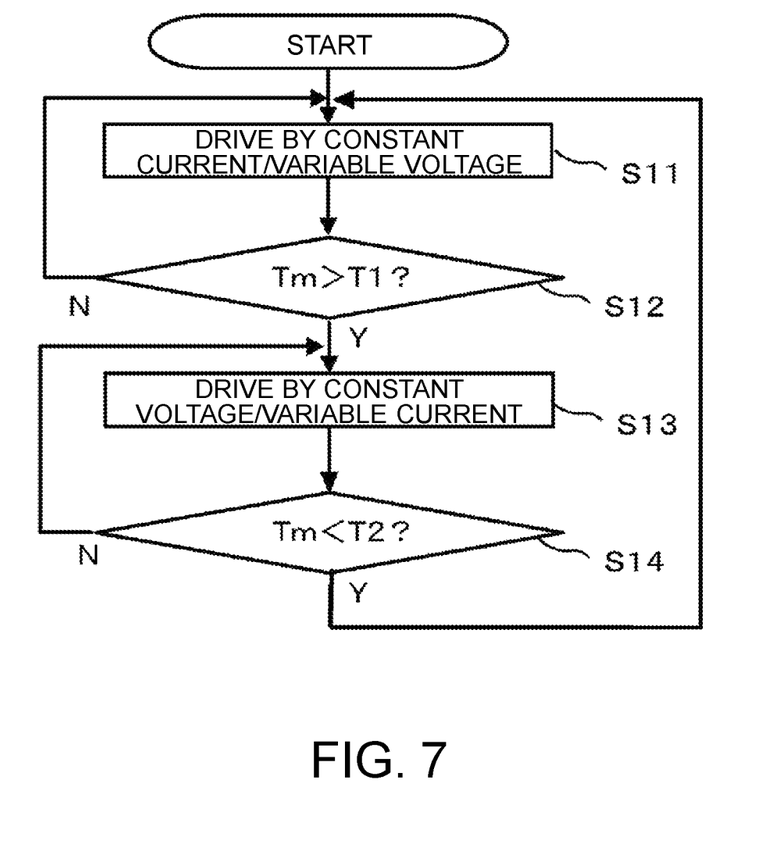
FIG. 7 is a flowchart illustrating motor control processing in a modification example.

Specifically, the control unit 31 starts the processing, then sets the current value I to be constant at the predetermined current I' (constant current), and changes the voltage value V in accordance with the necessary power P (variable voltage) first similarly to the case in which the necessary power P is equal to or greater than the threshold value Pth in the aforementioned first embodiment as illustrated in FIG. 7, for example. The control unit 31 controls the drive voltage of the motor 1 by controlling the inverter 3 as described above on the basis of the thus obtained voltage value and current value (S11).

Figure 8:
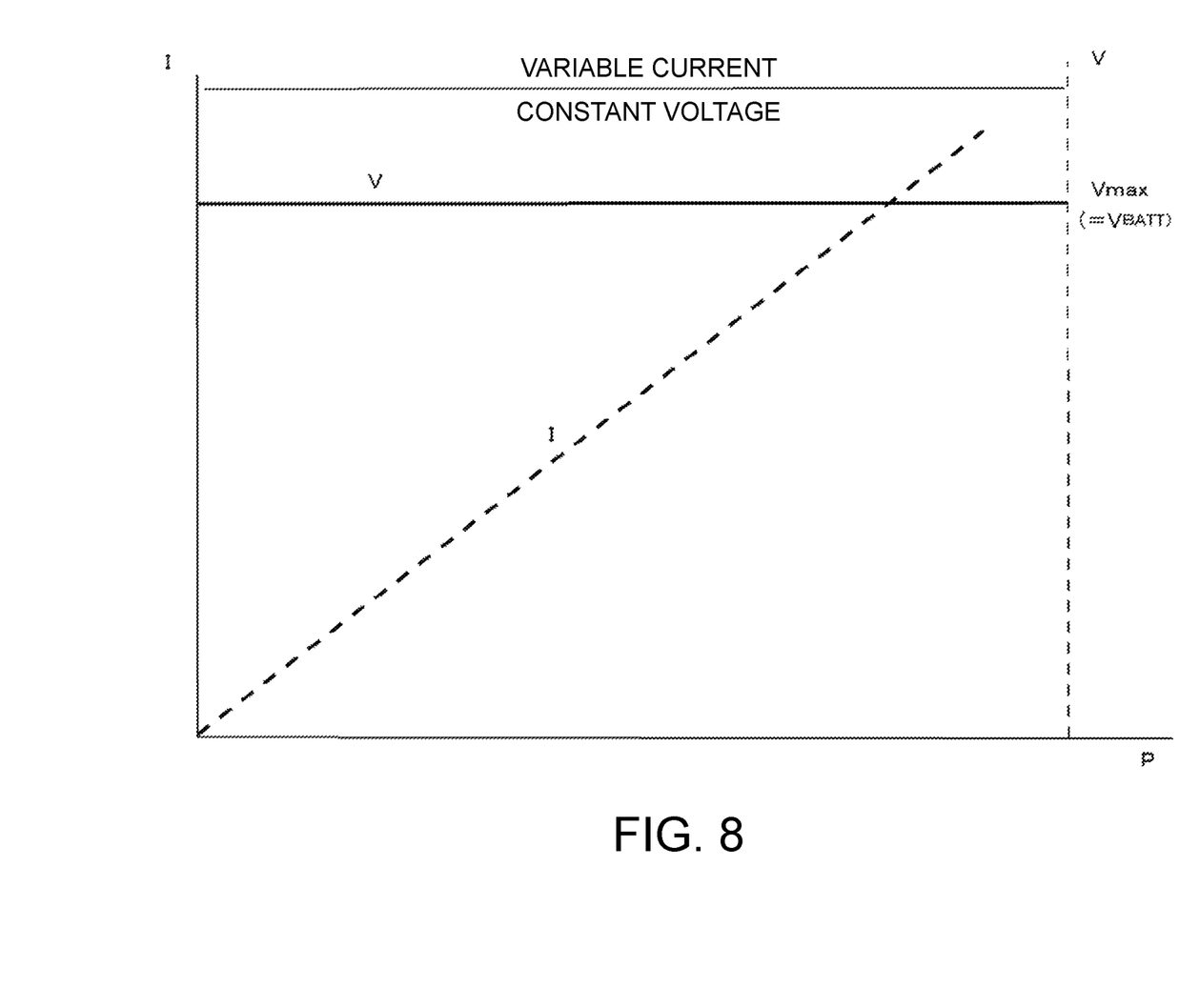
FIG. 8 is a diagram illustrating an example of a relationship between a voltage and a current to be applied to the inverter.

Further, the control unit 31 determines whether or not a temperature Tm of the motor 1 detected by the temperature sensor 12 exceeds a first threshold value T1 set in advance (S12). If the temperature Tm of the moor 1 does not exceed the threshold value T1, the control unit 31 continues the processing in S11. In a case in which the temperature Tm exceeds the threshold value T1, the control unit 31 moves on to S13, sets the voltage value V to be constant at a predetermined voltage Vmax (=VBATT) (constant voltage) and changes the current value I in accordance with the necessary power P (variable current) as illustrated in FIG. 8, for example. The control unit 31 controls the inverter 3 as described above and controls the drive voltage of the motor 1 on the basis of the thus obtained voltage value and current value.

Further, the control unit 31 determines whether or not the temperature Tm is less than a second threshold value T2 (T2<T1) set in advance (S14). If the temperature Tm is equal to or greater than T2, the control unit 31 continues the processing in S13. In a case in which the temperature Tm is less than the threshold value T2, the control unit 31 moves on to S11 and repeats the aforementioned processing.

Incidentally, in a case in which such control that the current value I is set to be constant at the predetermined current I' (constant current) and the voltage V is changed in accordance with the necessary power P (variable voltage) is performed as in the processing in S11 described above, the current flowing through the field coil is maintained to be higher than an optimal current value while the loss of the inverter 3 can be reduced. As a result, the temperature of the motor rises due to heat generation (so-called copper loss) caused by resistance of the field coil of the motor 1.

Meanwhile, in a case in which such control that the voltage value V is set to be constant at a predetermined voltage Vmax (constant voltage) and the current value I is changed in accordance with the necessary power P (variable current) is performed as in the processing in S13 as described above, the current value is lower than that in the case of S11 since the current value varies in accordance with the necessary power while the loss of the inverter 3 increases since the voltage value V is maintained to be high. Therefore, heat generation caused by the resistance of the field coil of the motor 1 is suppressed as compared with the case in S11. As a result, it is possible to contribute to dropping of the temperature Tm of the motor 1 that has already increased.

In addition, although determination for switching the method of driving the motor 1 may be made by comparing the temperature Tm of the motor 1 with only one threshold value, there is a probability that switching of the driving method frequently occurs depending on situations. Therefore, it is possible to suppress the frequency of switching of the method of controlling the motor by setting the threshold values T1 and T2 (T2<T1) and performing the control processing as described above.

Figure 9:
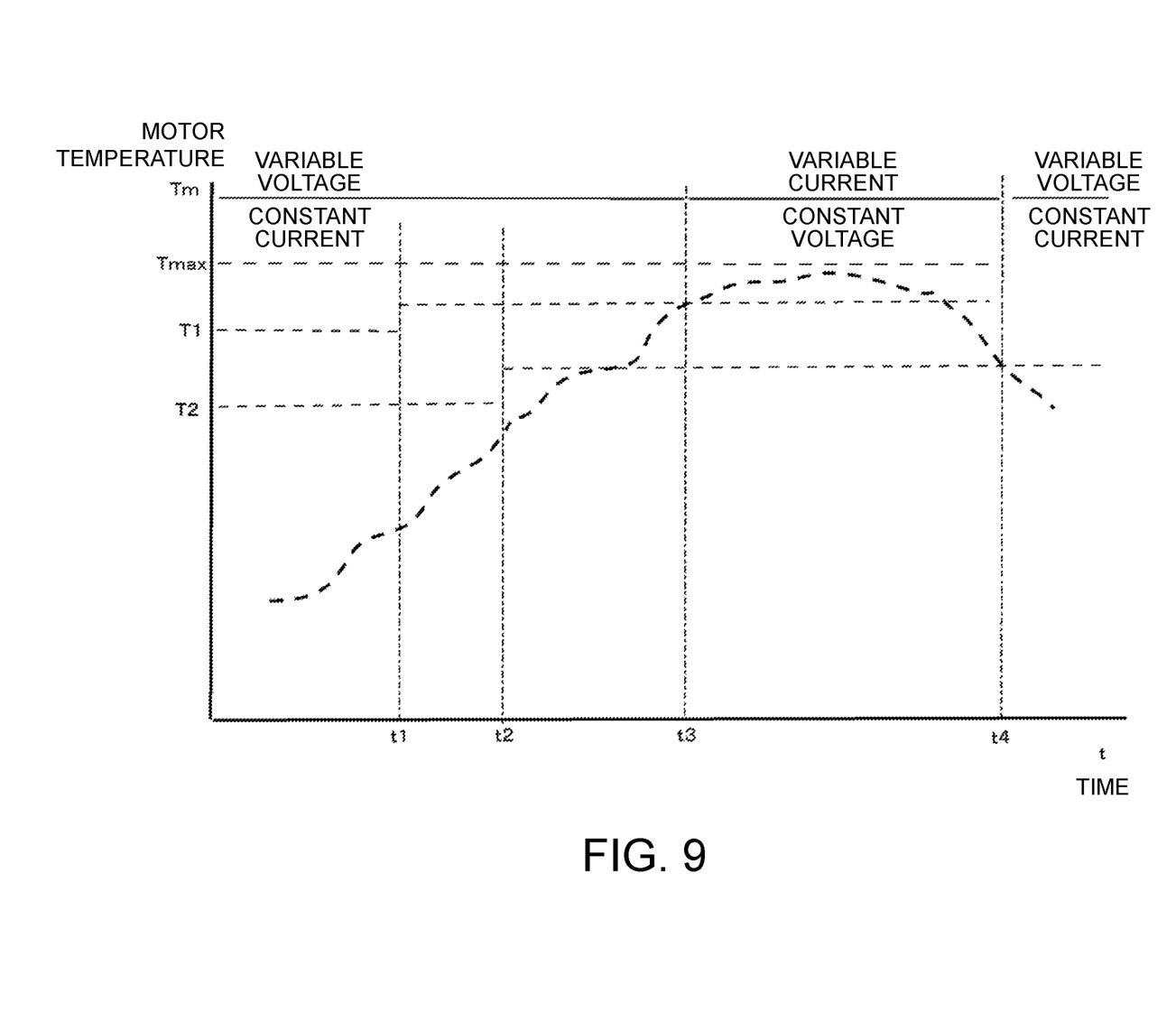
FIG. 9 is a flowchart illustrating an example of a change in a temperature of the motor.

Incidentally, the control unit 31 may input environment information such as a temperature (external temperature) in the surroundings of the motor 1 detected by the temperature sensor 6 or a temperature of the coolant that cools the motor 1 and dynamically change either the aforementioned threshold value T1 or the threshold value T2 or both the threshold value 1 and the threshold value T2 in accordance with the environment information. In a case of an environment in which the motor 1 tends to be cooled, such as a case in which the external temperature is low or the temperature of the coolant is low, the control unit 31 changes the threshold values T1 and T2 to be higher than those in a case of an environment in which the motor 1 tends not to be cooled as represented at the times t1 and t2 in FIG. 9, for example. In contrast, in a case of an environment in which the motor 1 tends not to be cooled, such as a case in which the external temperature is high or the temperature of the coolant is high, the control unit 31 changes the threshold values T1 and T2 to be lower than values in a case of the environment in which the motor 1 tends to be cooled. It is possible to appropriately manage the temperature of the motor 1 in accordance with the environment by performing such control.

As described above, the motor is driven by constant current/variable voltage control in which the current value is set to the predetermined current value and the voltage value is changed in accordance with the necessary power in the case in which the temperature of the motor is equal to or less than the first threshold value T1, and the motor is driven by constant voltage/variable current control in which the voltage value is set to the predetermined voltage value and the current value is changed in accordance with the necessary power in the case in which the temperature of the motor exceeds the first threshold value T1 in the embodiment. That is, it is possible to appropriately manage the temperature of the motor by changing the method of controlling the motor in accordance with the temperature of the motor in the embodiment.

In addition, although the case in which the method of controlling the motor is changed in accordance with the temperature of the motor has been described in the above description, the method of controlling the motor may be further changed in accordance with a temperature of the drive element (IGBT 32 or the like) that the inverter 3 includes. In this case, the control unit 31 performs such control that the current value I is set to be constant at the predetermined current I' (constant current) and changes the voltage value V in accordance with the necessary power P (variable voltage) in a case in which the temperature of the IGBT 32 or the like that the temperature sensor 33 of the inverter 3 detects exceeds a third threshold value T3 set in advance, for example. That is, the control unit 31 switches the method of controlling the motor to the constant current/variable voltage control. In the constant voltage/variable current control, although a load on the drive element is high, and there may be a case in which the temperature of the drive element rises depending on situations, it is possible to reduce the load on the drive element and to suppress the temperature rise by switching the control method to the constant current/variable voltage control. In this manner, it is possible to appropriately manage the temperature of the drive element.

In addition, output restriction, for example, output restriction such as reduction of the calculated necessary power P may be performed in a case in which the temperature of the motor is greater than the first threshold value T1 and exceeds a fourth threshold value T4 that is lower than a temperature upper limit Tmax of the motor. In this manner, it is possible to more appropriately manage the temperature of the motor.

Note that the control in the aforementioned embodiment and the control in the modification example may be combined. That is, the changing of the method of controlling the motor in accordance with whether or not the necessary power is less than the threshold value and the changing of the method of controlling the motor in accordance with the temperature of the motor are performed at the same time. In this manner, it is possible to obtain both the results of the first embodiment and the results of the second embodiment.

In addition, although the voltage V in accordance with the voltage requested by the control unit 31 is generated by lowering the voltage by the voltage lowering DCDC conversion unit 5 in the aforementioned respective embodiments, it is possible to obtain results that are similar to those described above even if a voltage raising DCDC conversion unit that generates the voltage V in accordance with the voltage requested by the control unit 31 by raising the voltage is provided.

Also, although the drive voltage of the motor 1 is generated by sine wave drive in the aforementioned respective embodiments, the drive voltage may be generated by rectangular wave drive instead of the sine wave drive.

In addition, although the case in which the drive control of the brushless motor is performed, for example, has been described in the aforementioned respective embodiments, the present disclosure can be applied to a case in which drive control of a three-phase synchronous motor or the like is performed by using an inverter.

The above-described exemplary embodiments and the modifications thereof may be combined appropriately as long as no conflict arises.

While exemplary embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control device comprising:
   a torque designation value input unit that inputs a torque designation value indicating a necessary torque value;
   a rotational speed input unit that inputs a rotational speed of a motor;
   a control unit that calculates necessary power that is necessary to drive the motor in accordance with the torque designation value being input and the rotational speed of the motor being input and calculates a voltage value and a current value that are necessary to drive the motor in accordance with the necessary power being calculated;
   a voltage supply unit that outputs a voltage in accordance with the voltage value being calculated; and
   an inverter unit that generates a drive signal for driving the motor from the voltage output from the voltage supply unit in accordance with the current value being calculated,
   wherein the control unit:
   sets the voltage value to a predetermined voltage value and changes the current value in accordance with the necessary power in a case in which the necessary power being calculated is less than a predetermined threshold value, and
   sets the current value to a predetermined current value and changes the voltage value in accordance with the necessary power in a case in which the necessary power being calculated is equal to or greater than the predetermined threshold value.

2. The motor control device according to claim 1, wherein the voltage supply unit outputs a voltage in accordance with the voltage value by lowering the voltage from a predetermined power source voltage.

3. The motor control device according to claim 1, wherein the control unit causes the inverter unit to generate the drive signal in accordance with the current value by changing a duty ratio of a pulse in PWM control.

4. The motor control device according to claim 1, further comprising:
   an acceleration input unit that inputs an accelerator position,
   wherein the torque designation value input unit inputs a torque designation value in accordance with the accelerator position input by the acceleration input unit, and
   the control unit calculates the voltage value such that a voltage lowering ratio at which the voltage supply unit lowers the voltage is changed in accordance with the torque designation value in accordance with the accelerator position.

5. The motor control device according to claim 1, further comprising:
   a temperature input unit that inputs a temperature of e motor,
   wherein the control unit
   sets the current value to a predetermined current value and changes the voltage value in accordance with the necessary powerin a case in which the temperature of the motor input by the temperature input unit is equal to or less than a first threshold value, and
   sets the voltage value to a predetermined voltage value and changes the current value in accordance with the necessary power in a case in which the temperature of the motor input by the temperature input unit is greater than the first threshold value.

* * * * *